US008996330B2

(12) United States Patent
Anderson et al.

(10) Patent No.: US 8,996,330 B2
(45) Date of Patent: Mar. 31, 2015

(54) METHOD AND SYSTEM FOR MANAGING THERMAL POLICIES OF A PORTABLE COMPUTING DEVICE

(75) Inventors: Jon James Anderson, Boulder, CO (US); Jeffrey A. Niemann, Boulder, CO (US); Bohuslav Rychlik, San Diego, CA (US); Sumit Sur, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 741 days.

(21) Appl. No.: 13/101,919

(22) Filed: May 5, 2011

(65) Prior Publication Data
US 2012/0179416 A1 Jul. 12, 2012

Related U.S. Application Data

(60) Provisional application No. 61/430,261, filed on Jan. 6, 2011.

(51) Int. Cl.
G01K 13/00 (2006.01)
G06F 1/32 (2006.01)
G06F 1/20 (2006.01)

(52) U.S. Cl.
CPC .............. G06F 1/3296 (2013.01); G06F 1/203 (2013.01); G06F 1/206 (2013.01); G06F 1/324 (2013.01); Y02B 60/1217 (2013.01); Y02B 60/1285 (2013.01)
USPC ........... 702/130; 713/300; 713/320; 713/322; 713/324

(58) Field of Classification Search
CPC ........ G06F 1/206; G06F 1/3203; G06F 1/324

USPC ................... 702/130; 713/300, 320, 322, 324
See application file for complete search history.

(56) References Cited

U.S. PATENT DOCUMENTS 6,140,860 A 10/2000 Sandhu et al.
6,336,080 B1 1/2002 Atkinson
(Continued)

FOREIGN PATENT DOCUMENTS

EP 0730217 A1 9/1996
EP 1085399 A1 3/2001
(Continued)

OTHER PUBLICATIONS

International Search Report and Written Opinion—PCT/US2012/020419—ISA/EPO—Jun. 14, 2012.

*Primary Examiner* — Janet Suglo
(74) *Attorney, Agent, or Firm* — Nicholas A. Cole

(57) ABSTRACT

A method and system for managing one or more thermal policies of a portable computing device (PCD) includes monitoring temperature of the portable computing device with internal thermal sensors and external thermal sensors. If a change in temperature has been detected by at least one thermal sensor, then a thermal policy manager may increase a frequency in which temperature readings are detected by the thermal sensors. The thermal policy manager may also determine if a current temperature of the portable computing device as detected by one or more of the thermal sensors falls within one or more predetermined thermal states. Each thermal state may be assigned a unique set of thermal mitigation techniques. Each set of thermal mitigation techniques may be different from one another. The sets of thermal mitigation techniques may differ according to quantity of techniques and impacts on performance of the PCD.

16 Claims, 12 Drawing Sheets

(56) References Cited

U.S. PATENT DOCUMENTS

| | | |
|---|---|---|
| 7,389,438 B2 | 6/2008 | Watts, Jr. |
| 2001/0001880 A1* | 5/2001 | Watts, Jr. .................... 713/322 |
| 2004/0088593 A1 | 5/2004 | Park |
| 2004/0117669 A1 | 6/2004 | Wilson |
| 2006/0161375 A1 | 7/2006 | Duberstein et al. |
| 2007/0156370 A1 | 7/2007 | White et al. |
| 2008/0034232 A1* | 2/2008 | Rangarajan et al. .......... 713/300 |
| 2009/0299543 A1 | 12/2009 | Cox et al. |
| 2010/0073068 A1 | 3/2010 | Cho et al. |
| 2010/0144308 A1 | 6/2010 | Jin et al. |
| 2010/0146313 A1 | 6/2010 | Jager |
| 2010/0330950 A1 | 12/2010 | Wells et al. |
| 2012/0075992 A1 | 3/2012 | Shahidi et al. |
| 2012/0179303 A1 | 7/2012 | Anderson et al. |

FOREIGN PATENT DOCUMENTS

| | | |
|---|---|---|
| EP | 1111491 A2 | 6/2001 |
| EP | 1361501 A2 | 11/2003 |
| JP | H0922317 A | 1/1997 |
| JP | 2001067149 A | 3/2001 |
| JP | 2001085586 A | 3/2001 |
| JP | 2005215794 A | 8/2005 |
| JP | 2007148713 A | 6/2007 |
| JP | 2007323678 A | 12/2007 |
| KR | 20080097419 A | 11/2008 |

\* cited by examiner

| DVFS Algorithm | Core 0 | Core 1 | Core N |
|---|---|---|---|
| DVFS Alg. # 1 | 600 MHz | 650 MHz | 720 MHz |
| DVFS Alg. # 2 | 550 MHz | 600 MHz | 650 MHz |
| DVFS Alg. # 3 | 450 MHz | 500 MHz | 550 MHz |
| DVFS Alg. #N | X MHz | Y MHz | Z MHz |

| DVFS Alg. | Core 0 Freq. | Core 0 Voltage | Core 1 Freq. | Core 1 Voltage | Core N Freq. | Core N Voltage |
|---|---|---|---|---|---|---|
| DVFS Alg #1 | 600 MHz | 1.3 V | 500 MHz | 2.0 V | 550 MHz | 2.0 V |
| DVFS Alg #2 | 550 MHz | 1.0 V | 450 MHz | 1.5 V | 500 MHz | 1.9 V |
| DVFS Alg #3 | 450 MHz | 0.9V | 350 MHz | 1.0 V | 400 MHz | 1.3 V |
| DVFS Alg #N | X MHz | A V | Y MHz | B V | Z MHz | C V |

400

NORMAL STATE —305

- NORMAL MONITORING/POLLING/INTERRUPTS FROM THERMAL SENSORS
- NO THERMAL MITIGATION TECHNIQUE(S) APPLIED

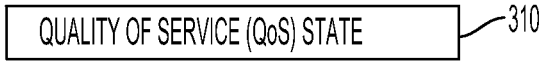
QUALITY OF SERVICE (QoS) STATE —310

- MORE RAPID MONITORING/POLLING/INTERRUPTS FROM THERMAL SENSORS
- START APPLYING THERMAL MITIGATION TECHNIQUE(S) BUT WITH OBJECTIVE TO MAINTAIN HIGHEST PERFORMANCE AND LITTLE OR NO PERCEPTION IN QUALITY OF SERVICE TO OPERATOR OF DEVICE

SEVERE STATE —315

- CONTINUOUS MONITORING/POLLING/INTERRUPTS FROM THERMAL SENSORS
- APPLY MORE AGGRESSIVE THERMAL MITIGATION TECHNIQUE(S) AND/OR ADDITIONAL THERMAL MITIGATION TECHNIQUES WITH PROBABLE PERCEIVABLE DEGRADATION OF PERFORMANCE BY OPERATOR OF DEVICE
- REDUCE POWER TO DEVICES (AMPLIFIERS, PROCESSORS)
- SHIFT WORKLOADS IN A SPATIAL MANNER
- ADJUST PARAMETERS OF WORKLOAD ALGORITHMS (DVFS, ETC)

CRITICAL STATE —320

- SHUT DOWN NON-ESSENTIAL DEVICES!!
- MAINTAIN ONLY E911 AND GPS FUNCTIONS

FIG. 4

METHOD AND SYSTEM FOR MANAGING THERMAL POLICIES OF A PORTABLE COMPUTING DEVICE

CROSS-REFERENCE TO RELATED APPLICATIONS

Priority under 35 U.S.C. §119(e) is claimed to U.S. provisional application entitled, "METHOD AND SYSTEM FOR MANAGING THERMAL POLICIES OF A PORTABLE COMPUTING DEVICE," filed on Jan. 6, 2011 and assigned application Ser. No. 61/430,261. The entire contents of this application are hereby incorporated by reference.

DESCRIPTION OF THE RELATED ART

Portable computing devices (PCDs) are becoming necessities for people on personal and professional levels. These devices may include cellular telephones, portable digital assistants (PDAs), portable game consoles, palmtop computers, and other portable electronic devices.

One unique aspect of PCDs is that they typically do not have active cooling devices, like fans, which are often found in larger computing devices like laptop and desk top computers. Instead of using fans, PCDs may rely on the spatial arrangement of electronic packaging so that two or more active and heat producing devices are not positioned in close proximity to one another. When two or more heat devices are not placed in close proximity to one another, then usually their operation does not negatively impact each other and any other electronics that may surround them. Many PCDs may also rely on passive cooling devices such as heat sinks to manage thermal energy among the electronics forming a respective PCD.

However, the spatial arrangement of electronic packaging and passive cooling devices, like heatsinks, are sometimes not adequate enough to prevent a PCD from reaching critical temperatures. Such critical thermal temperatures may cause permanent damage to the electronics within a respective PCD. Currently, when a PCD approaches a critical temperature, the operating system is designed to shut down most of the electronics generating the thermal energy in order to cool the PCD. While shutting down electronics may be effective to avoid critical temperatures that may cause permanent damage, such drastic measures directly impact performance of the PCD and may render a PCD useless with respect to its functionality when such measures are taken.

Accordingly, what is needed in the art is a method and system for managing one or more thermal policies that allow a PCD to cool electronics while maintaining performance and functionality for an end-user.

SUMMARY OF THE DISCLOSURE

A method and system for managing one or more thermal policies of a portable computing device (PCD) includes monitoring temperature of the portable computing device with internal thermal sensors and external thermal sensors. If a change in temperature has been detected by at least one thermal sensor, then a thermal policy manager may increase a frequency in which temperature readings are detected by the thermal sensors. The thermal policy manager may also determine if a current temperature of the portable computing device as detected by one or more of the thermal sensors falls within one or more predetermined thermal states. Each thermal state may be assigned a unique set of thermal mitigation techniques. Each set of thermal mitigation techniques may be different from one another. The sets of thermal mitigation techniques may differ according to quantity of techniques and impacts on performance of the PCD.

BRIEF DESCRIPTION OF THE DRAWINGS

In the figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 4 is a diagram illustrating exemplary thermal mitigation techniques that may be applied or ordered by the thermal policy manager;

DETAILED DESCRIPTION

Figure 1:
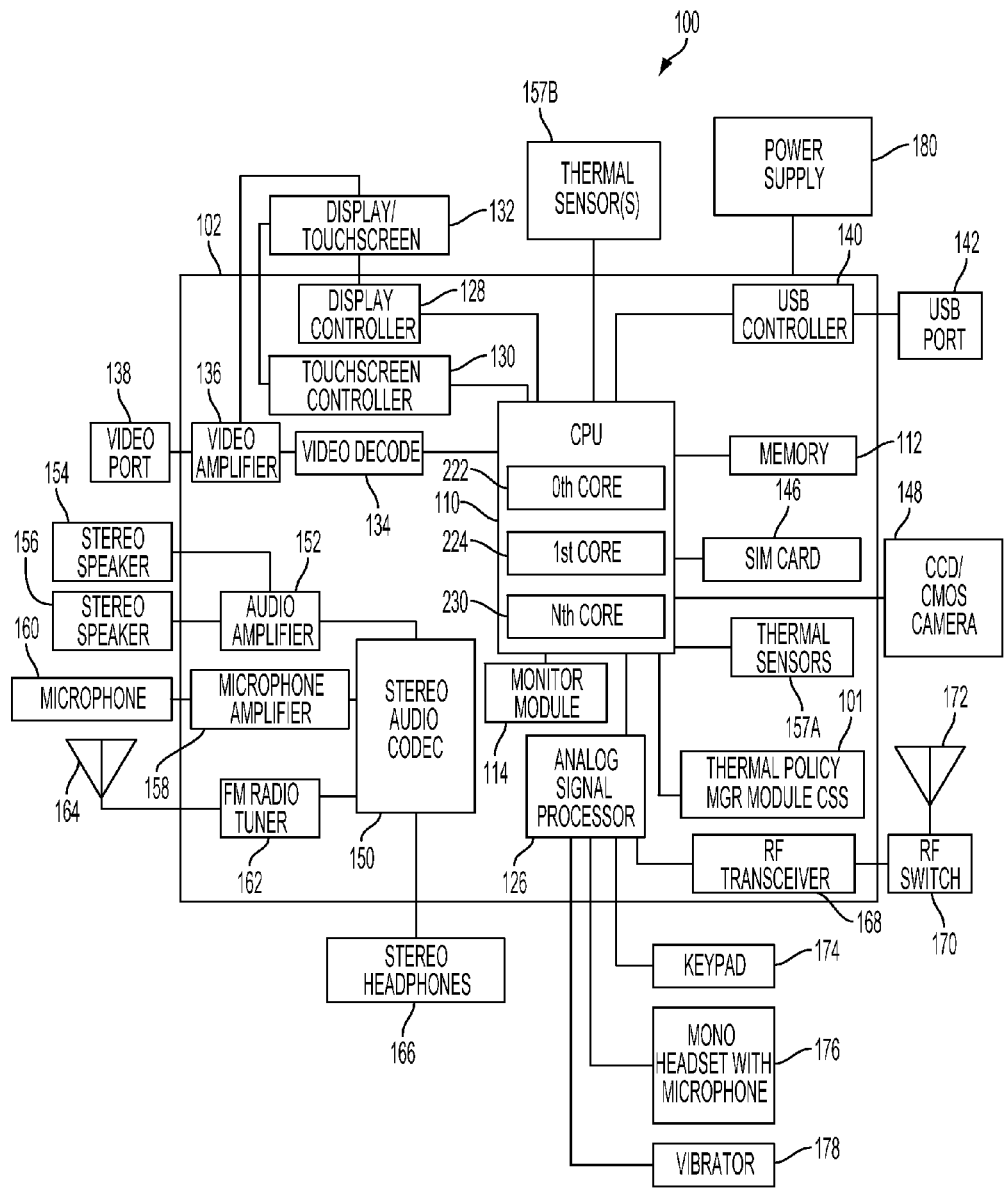
FIG. 1 is a functional block diagram illustrating an embodiment of a portable computing device (PCD)

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") and fourth generation ("4G") wireless technology, greater bandwidth availability has enabled more portable computing devices with a greater variety of wireless capabilities.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") wireless technology, have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, and a laptop computer with a wireless connection, among others.

FIG. 1: Thermal Policy Management Elements of PCD 100

Referring to FIG. 1, this FIG. is a functional block diagram of an exemplary, non-limiting aspect of a PCD 100 in the form of a wireless telephone for implementing methods and systems for monitoring thermal conditions and managing thermal policies. As shown, the PCD 100 includes an on-chip system 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Instead of a CPU 110, a digital signal processor ("DSP") may also be employed as understood by one of ordinary skill in the art.

The CPU 110 may also be coupled to one or more internal, on-chip thermal sensors 157A as well as one or more external, off-chip thermal sensors 157B. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop that is converted to digital signals with an analog-to-digital converter ("ADC") controller 103 (See FIG. 2A). However, other types of thermal sensors 157 may be employed without departing from the scope of the invention.

The thermal sensors 157 in addition to being controlled and monitored by an ADC controller 103, may also be controlled and monitored by one or more thermal policy manager module(s) 101. The thermal policy manager module(s) may comprise software which is executed by the CPU 110. However, the thermal policy manager module(s) 101 may also be formed from hardware and/or firmware without departing from the scope of the invention.

In general, the thermal policy manager module(s) 101 may be responsible for monitoring and applying thermal policies that include one or more thermal mitigation techniques that may help a PCD 100 manage thermal conditions and/or thermal loads and avoid experiencing adverse thermal conditions, such as, for example, reaching critical temperatures while maintaining a high level of functionality.

FIG. 1 also shows that the PCD 100 may include a monitor module 114. The monitor module 114 communicates with multiple operational sensors (e.g., thermal sensors 157) distributed throughout the on-chip system 102 and with the CPU 110 of the PCD 100 as well as with the thermal policy manager module 101. The thermal policy manager module 101 may work with the monitor module 114 to identify adverse thermal conditions and apply thermal policies that include one or more thermal mitigation techniques as will be described in further detail below.

In a particular aspect, one or more of the method steps described herein may implemented by executable instructions and parameters stored in the memory 112 that form the one or more thermal policy manager module(s) 101. These instructions that form the thermal policy manager module(s) may be executed by the CPU 110, the analog signal processor 126, or another processor, in addition to the ADC controller 103 to perform the methods described herein. Further, the processors, 110, 126, the memory 112, the instructions stored therein, or a combination thereof may serve as a means for performing one or more of the method steps described herein.

FIG. 1: Other Elements of PCD 100

As illustrated in FIG. 1, a display controller 128 and a touchscreen controller 130 are coupled to the digital signal processor 110. A touchscreen display 132 external to the on-chip system 102 is coupled to the display controller 128 and the touchscreen controller 130.

FIG. 1 is a schematic diagram illustrating an embodiment of a portable computing device (PCD) that includes a video decoder 134. The video decoder 134 is coupled to the multicore central processing unit ("CPU") 110. A video amplifier 136 is coupled to the video decoder 134 and the touchscreen display 132. A video port 138 is coupled to the video amplifier 136. As depicted in FIG. 1, a universal serial bus ("USB") controller 140 is coupled to the CPU 110. Also, a USB port 142 is coupled to the USB controller 140. A memory 112 and a subscriber identity module (SIM) card 146 may also be coupled to the CPU 110. Further, as shown in FIG. 1, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1 further indicates that a radio frequency ("RF") transceiver 168 may be coupled to the analog signal processor 126. An RF switch 170 may be coupled to the RF transceiver 168 and an RF antenna 172. As shown in FIG. 1, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1 also shows that a power supply 180, for example a battery, is coupled to the on-chip system 102. In a particular aspect, the power supply includes a rechargeable DC battery or a DC power supply that is derived from an alternating current ("AC") to DC transformer that is connected to an AC power source.

As depicted in FIG. 1, the touchscreen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, and the power supply 180 are external to the on-chip system 322. However, it should be understood that the monitor module 114 may also receive one or more indications or signals from one or more of these external devices by way of the analog signal processor 126 and the CPU 110 to aid in the real time management of the resources operable on the PCD 100.

Figure 2A:
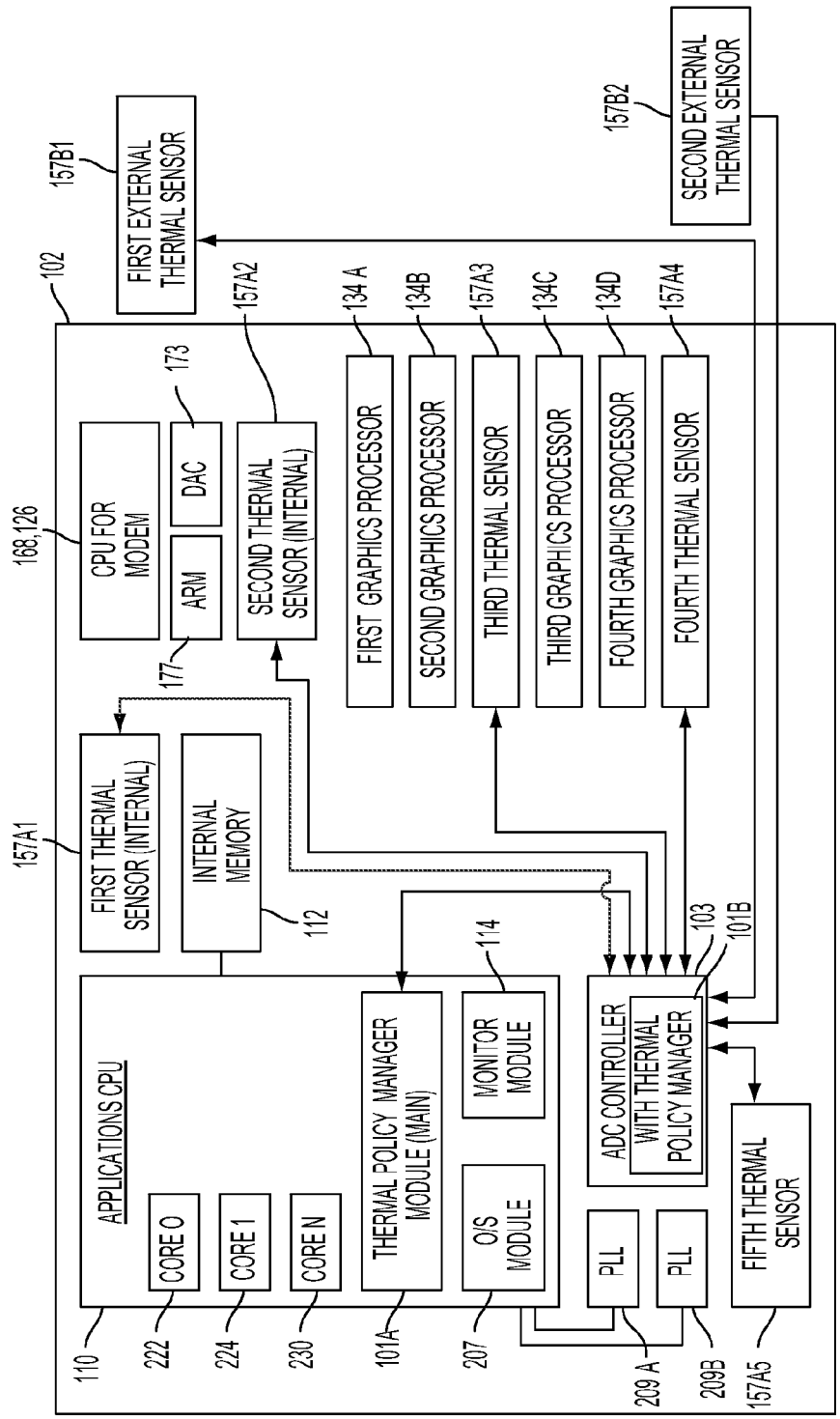
FIG. 2A is a functional block diagram illustrating an exemplary spatial arrangement of hardware for a chip illustrated in FIG. 1.

FIG. 2A is a functional block diagram illustrating an exemplary spatial arrangement of hardware for the chip 102 illustrated in FIG. 1. According to this exemplary embodiment, the applications CPU 110 is positioned on the far left side region of the chip 102 while the modem CPU 168/126 is positioned on a far right side region of the chip 102. The applications CPU 110 may comprise a multicore processor that includes a zeroth core 222, a first core 224, and an Nth core 230.

The applications CPU 110 may be executing a thermal policy manager module 101A (when embodied in software) or it may include a thermal policy manager module 101B (when embodied in hardware and/or firmware). The applications CPU 110 is further illustrated to include operating system ("O/S") module 207 and a monitor module 114. Further details about the monitor module 114 will be described below in connection with FIG. 2B.

The applications CPU 110 may be coupled to one or more phase locked loops ("PLLs") 209A, 209B which are positioned adjacent to the applications CPU 110 and in the left side region of the chip 102. Adjacent to the PLLs 209A, 209B and below the applications CPU 110 may comprise an analog-to-digital ("ADC") controller 103 that may include its own thermal policy manager 101B that works in conjunction with the main thermal policy manager module 101A of the applications CPU 110.

The thermal policy manager 101B of the ADC controller 103 may be responsible for monitoring and tracking multiple thermal sensors 157 that may be provided "on-chip" 102 and "off-chip" 102. The on-chip or internal thermal sensors 157A may be positioned at various locations to monitor the thermal conditions of the PCD 100.

For example, a first internal thermal sensor 157A1 may be positioned in a top center region of the chip 102 between the applications CPU 110 and the modem CPU 168/126 and adjacent to internal memory 112. A second internal thermal sensor 157A2 may be positioned below the modem CPU 168/126 on a right side region of the chip 102. This second internal thermal sensor 157A2 may also be positioned between a an advanced reduced instruction set computer ("RISC") instruction set machine ("ARM") 177 and a first graphics processor 134A. A digital-to-analog controller ("DAC") 173 may be positioned between the second internal thermal sensor 157A2 and the modem CPU 168/126.

A third internal thermal sensor 157A3 may be positioned between a second graphics processor 134B and a third graphics processor 134C in a far right region of the chip 102. A fourth internal thermal sensor 157A4 may be positioned in a far right region of the chip 102 and beneath a fourth graphics processor 134D. And a fifth internal thermal sensor 157A5 may be positioned in a far left region of the chip 102 and adjacent to the PLLs 209 and ADC controller 103.

One or more external thermal sensors 157B may also be coupled to the ADC controller 103. The first external thermal sensor 157B1 may be positioned off-chip and adjacent to a top right quadrant of the chip 102 that may include the modem CPU 168/126, the ARM 177, and DAC 173. A second external thermal sensor 157B2 may be positioned off-chip and adjacent to a lower right quadrant of the chip 102 that may include the third and fourth graphics processors 134C, 134D.

One of ordinary skill in the art will recognize that various other spatial arrangements of the hardware illustrated in FIG. 2A (or other hardware resources) may be provided without departing from the scope of the invention. FIG. 2A illustrates yet one exemplary spatial arrangement and how the main thermal policy manager module 101A and ADC controller 103 with its thermal policy manager 101B may manage thermal states that are a function of the exemplary spatial arrangement illustrated in FIG. 2A.

Thermal sensors 157 may be positioned adjacent to hardware, such the CPU 110, and on a same surface with the hardware within the portable computing device 100. For example, see the first internal thermal sensor 157A1. The thermal policy manager 101A may assign one or more specific thermal mitigation techniques unique to the hardware associated with a particular thermal sensor 157, such as the CPU 110 corresponding to the first internal thermal sensor 157A1. In one exemplary embodiment, the thermal mitigation techniques assigned to the CPU 110 and its corresponding thermal sensor 157A1 may be different compared to the thermal mitigation techniques assigned to the third graphical processor 134C associated with the third thermal sensor 157A3. In other exemplary embodiments, the thermal mitigation techniques applied to hardware may be uniform or the same across the whole portable computing device 100.

Figure 2B:
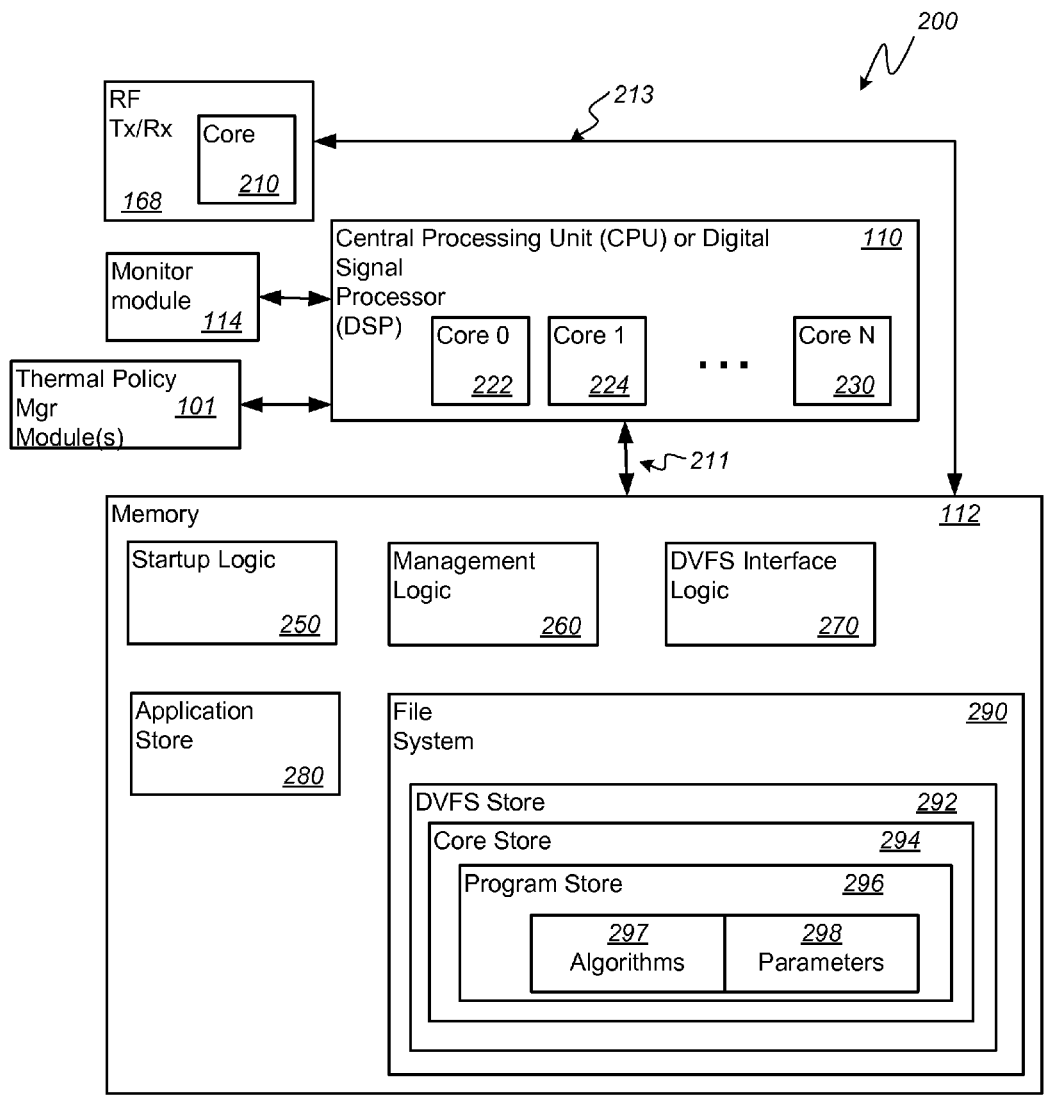
FIG. 2B is a schematic diagram illustrating an exemplary software architecture of the PCD of FIG. 1 for supporting dynamic voltage and frequency scaling ("DVFS") algorithms.

FIG. 2B is a schematic diagram illustrating an exemplary software architecture of the PCD 100 of FIG. 1 and FIG. 2A for supporting dynamic voltage and frequency scaling ("DVFS") algorithms. DVFS algorithms may form or be part of at least one thermal mitigation technique that may be triggered by the thermal policy manager 101 when certain thermal conditions are met as will be described in detail below.

As illustrated in FIG. 2B, the CPU or digital signal processor 110 is coupled to the memory 112 via a bus 211. The CPU 110, as noted above, is a multiple-core processor having N core processors. That is, the CPU 110 includes a first core 222, a second core 224, and a $N^{th}$ core 230. As is known to one of ordinary skill in the art, each of the first core 222, the second core 224 and the $N^{th}$ core 230 are available for supporting a dedicated application or program. Alternatively, one or more applications or programs can be distributed for processing across two or more of the available cores.

The CPU 110 may receive commands from the thermal policy manager module(s) 101 that may comprise software and/or hardware. If embodied as software, the thermal policy manager module 101 comprises instructions that are executed by the CPU 110 that issues commands to other application programs being executed by the CPU 110 and other processors.

The first core 222, the second core 224 through to the Nth core 230 of the CPU 110 may be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh and crossbar topologies.

In the illustrated embodiment, the RF transceiver 168 is implemented via digital circuit elements and includes at least one processor such as the core processor 210 (labeled "Core"). In this digital implementation, the RF transceiver 168 is coupled to the memory 112 via bus 213.

Each of the bus 211 and the bus 213 may include multiple communication paths via one or more wired or wireless connections, as is known in the art. The bus 211 and the bus 213 may have additional elements, which are omitted for simplicity, such as controllers, buffers (caches), drivers, repeaters, and receivers, to enable communications. Further, the bus 211 and the bus 213 may include address, control, and/or data connections to enable appropriate communications among the aforementioned components.

When the logic used by the PCD 100 is implemented in software, as is shown in FIG. 2B, it should be noted that one or more of startup logic 250, management logic 260, dynamic voltage and frequency scaling ("DVFS") interface logic 270, applications in application store 280 and portions of the file system 290 may be stored on any computer-readable medium for use by or in connection with any computer-related system or method.

As understood by one of ordinary skill in the art, the demand for processors that provide high performance and low power consumption has led to the use of various power management techniques, such as, dynamic voltage and frequency scaling ("DVFS") in processor designs. DVFS enables trade-offs between power consumption and performance. Processors 110 and 126 (FIG. 1) may be designed to take advantage of DVFS by allowing the clock frequency of each processor to be adjusted with a corresponding adjustment in voltage. A reduction in operating voltage usually results in a proportional savings in power consumed. One main issue for DVFS enabled processors 110, 126 is how to control the balance between performance and power savings.

In the context of this document, a computer-readable medium is an electronic, magnetic, optical, or other physical device or means that can contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In hardware embodiments, the startup logic 250, management logic 260 and perhaps the DVFS interface logic 270 may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor and or the core 210 (or additional processor cores) in the RF transceiver 168.

The startup logic 250 includes one or more executable instructions for selectively identifying, loading, and executing a select program for managing or controlling the performance of one or more of the available cores such as the first core 222, the second core 224 through to the $N^{th}$ core 230. A select program can be found in the program store 296 of the embedded file system 290 and is defined by a specific combination of a performance scaling algorithm 297 and a set of parameters 298. The select program, when executed by one or more of the core processors in the CPU 110 and the core 210 in the RF transceiver 168, may operate in accordance with one or more signals provided by the monitor module 114 in combination with control signals provided by the one or more thermal policy manager module(s) 101 to scale the performance of the respective processor core. In this regard, the monitor module 114 may provide one or more indicators of events, processes, applications, resource status conditions, elapsed time, as well as temperature as received from the thermal policy manager module 101.

The management logic 260 includes one or more executable instructions for terminating an operative performance scaling program on one or more of the respective processor cores, as well as selectively identifying, loading, and executing a more suitable replacement program for managing or controlling the performance of one or more of the available cores. The management logic 260 is arranged to perform these functions at run time or while the PCD 100 is powered and in use by an operator of the device. A replacement program can be found in the program store 296 of the embedded file system 290 and is defined by a specific combination of a performance scaling algorithm 297 and a set of parameters 298.

The replacement program, when executed by one or more of the core processors in the digital signal processor or the core 210 in the RF transceiver 168, may operate in accordance with one or more signals provided by the monitor module 114 or one or more signals provided on the respective control inputs of the various processor cores to scale the performance of the respective processor core. In this regard, the monitor module 114 may provide one or more indicators of events, processes, applications, resource status conditions, elapsed time, temperature, etc in response to control signals originating from the thermal policy manager 101.

The DVFS interface logic or interface logic 270 includes one or more executable instructions for presenting, managing and interacting with external inputs to observe, configure, or otherwise update information stored in the embedded file system 290. In one embodiment, the DVFS interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the management logic 260 that instructs the PCD 100 to suspend all performance scaling in the RF transceiver 168 when the received signal power falls below an identified threshold. By way of further example, the inputs may include a change to the management logic 260 that instructs the PCD 100 to apply a desired program when the video codec 134 is active.

The DVFS interface logic 270 enables a manufacturer to controllably configure and adjust an end user's experience under defined operating conditions on the PCD 100. When the memory 112 is a flash memory, one or more of the startup logic 250, the management logic 260, the DVFS interface logic 270, the application programs in the application store 280 or information in the embedded file system 290 can be edited, replaced, or otherwise modified. In some embodiments, the DVFS interface logic 270 may permit an end user or operator of the PCD 100 to search, locate, modify or replace the startup logic 250, the management logic 260, applications in the application store 280 and information in the embedded file system 290. The operator may use the resulting interface to make changes that will be implemented upon the next startup of the PCD 100. Alternatively, the operator may use the resulting interface to make changes that are implemented during run time.

The embedded file system 290 includes a hierarchically arranged DVFS store 292. In this regard, the file system 290 may include a reserved section of its total file system capacity for the storage of information for the configuration and management of the various parameters 298 and performance scaling algorithms 297 used by the PCD 100. As shown in FIG. 2, the DVFS store 292 includes a core store 294, which includes a program store 296, which includes one or more DVFS programs. Each program is defined as a combination of a respective performance scaling algorithm and a set of parameters associated with the specific algorithm. As a further example of the hierarchical nature of the DVFS store 292, a particular member of a set of files may be located and identified by the path of \startup\core0\algorithm\parameterset. In this example, a program is identified by the algorithm in combination with the contents of information stored in the parameter set. For example, a conventional DVFS algorithm known as "classic" may be identified to manage performance scaling on core0 222 in accordance with the parameters sample rate, samples to increase, and samples to decrease as follows: \startup\core0\classic\SampleRate, with a value of 100, where the sample rate is in MHz; \startup\core0\classic\SamplesToIncrease, with a value of 2, where the samples to increase is an integer; and \startup\core0\classic\SamplesToDecrease, with a value of 1, where the samples to decrease is an integer.

That is, the respective filenames define a parameter and the value of the parameter is identified by the contents of the file. The algorithm is defined by a periodic sampling of the CPU idle percentage and operates in accordance with a low threshold (% idle) and a high threshold (% idle). If a samples-to-increase threshold comparator indicates for two consecutive samples that performance should be increased, the DVFS algorithm increases performance in accordance with a predetermined clock level adjustment. Conversely, if a samples-to-decrease threshold comparator indicates for 1 consecutive sample that performance should be decreased, the DVFS algorithm decreases performance in accordance with the predetermined clock level (i.e., frequency) adjustment. As explained above, processor or core operating voltage may be changed together with changes in the clock frequency.

Alternatively, or additionally, the DVFS store 292 may be arranged such that the search path starts from the most specific with respect to its application (i.e., the processor core, algorithm, and parameter value) progresses to the least specific with respect to application. In an example embodiment, parameters are defined in the directories /core0, /coreAll and /default in association with the "classic" performance scaling algorithm. For example, the path \core0\classic\SampleRate—applies only to the classic algorithm operating on core0. This most specific application will override all others. The path \coreAll\classic\SampleRate— applies to any processor core running the classic algorithm. This application is not as specific as the example path above but is more specific than \default\classic\SampleRate— which applies to any processor core running the classic algorithm.

This default application is the least specific and is used only if no other suitable path exists in the DVFS store 292. The first parameter found will be the one used. The \default location will always have a valid parameter file. The architecture of the individual cores, the architecture of the one or more shared caches and the mechanism(s) used to pass instructions between the cores, as well as the desired use cases for the PCD 100 are expected to dictate the nature of the various performance scaling algorithms 297 stored in the memory 112.

Figure 2C:
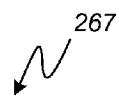
FIG. 2C is a first table listing exemplary frequency values for two DVFS algorithms.

FIG. 2C is a first table 267 listing exemplary frequency values for three or more different DVFS algorithms that may be selected by the DVFS interface logic 270. These exemplary values demonstrate throttling, in which the activity of one or more processors 110 and/or cores are reduced in order to mitigate thermal loads. According to this exemplary first table 267, each core of the multicore CPU 110 may be assigned specific maximum clock frequency values depending upon the current DVFS algorithm being executed. For the first DVFS algorithm that is listed in the first row of the table 627, Core 0 may be assigned a maximum clock frequency of 600 MHz, while Core 1 may be assigned a maximum clock frequency of 650 MHz, and the Nth Core may be assigned a maximum clock frequency of 720 MHz. For the second DVFS algorithm that is listed in the second row of the table 627, Core 0 may be assigned a maximum clock frequency of 550 MHz, while Core 1 is assigned a maximum clock frequency of 600 MHz, and the Nth core may be assigned a maximum clock frequency of 650 MHz. For the third DVFS algorithm that is listed in the second row of the table 627, Core 0 may be assigned a maximum clock frequency of 450 MHz, while Core 1 is assigned a maximum clock frequency of 500 MHz, and the Nth core may be assigned a maximum clock frequency of 550 MHz. These limits on clock frequency may be selected by the thermal policy manager 101 depending upon the current thermal state of the PCD 100.

Figure 2D:
FIG. 2D is a second table listing exemplary frequency and voltage pairs for two DVFS algorithms.

FIG. 2D is a second table 277 listing exemplary frequency and voltage pairs for three DVFS algorithms. This table 277, like the first table 267, demonstrates throttling of one or more processors 110 and/or corresponding cores. For the DVFS algorithm listed in the first row of the table 277, Core 0 may be assigned a maximum clock frequency of 600 MHz while its maximum voltage may be limited to 1.3 volts ("V"). Core 1 may be assigned a maximum clock frequency of 500 MHz and a corresponding maximum voltage of 2.0V. Core N may be assigned a maximum clock frequency of 550 MHz and a corresponding maximum voltage of 2.0V. For the second DVFS algorithm listed in the second row of the table 277, Core 0 may be assigned a maximum clock frequency of 550 MHz while the maximum voltage is assigned the value of 1.0V. Core 1 may be assigned a maximum clock frequency of 500 MHz and the corresponding maximum voltage of 1.5V.

For the second row, Core N may be assigned a maximum clock frequency of 500 MHz and a corresponding maximum voltage of 1.9V. For the third row, Core 0 may be assigned a maximum clock frequency of 450 MHz while the maximum voltage is assigned the value of 0.9V, while Core 1 may be assigned a maximum clock frequency of 350 MHz and the corresponding maximum voltage of 1.0V. Core N may be assigned a maximum clock frequency of 400 MHz and a corresponding maximum voltage of 1.3V. The thermal policy manager 101 may select the various pairs of frequency and voltages enumerated in table 277 depending upon the current thermal state of the PCD 100.

Figure 3:
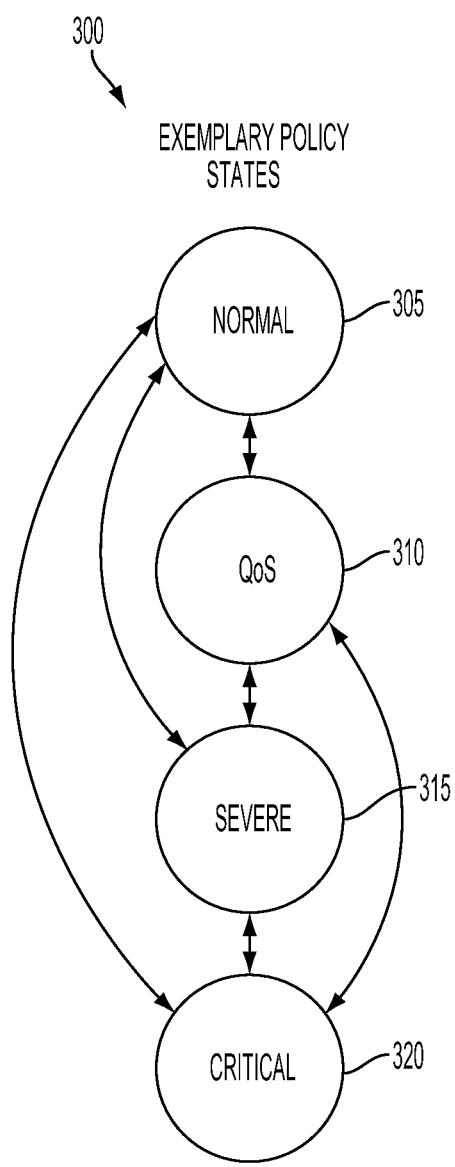
FIG. 3 is an exemplary state diagram that illustrates various thermal policy states that are tracked by the thermal policy manager in the PCD of FIG. 1.

FIG. 3 is an exemplary state diagram 300 that illustrates various thermal policy states 305, 310, 315, and 320 that are tracked by the thermal policy manager 101. While only four states are illustrated, one of ordinary skill in the art will recognize that other states beyond these four may be created. Similarly, one of ordinary skill in the art recognizes that fewer policies may be employed without departing from the invention. Further, additional sub-states or sub-policies may be added to each state 305, 310, 315, and 320 as understood by one of ordinary skill in the art.

The first policy state 305 may comprise a "normal" thermal state in which the thermal policy manager 101 only monitors thermal sensors 157 in a routine or ordinary fashion. In this exemplary first and normal state 305, the PCD 100 is usually not in any danger or risk of experiencing an adverse thermal condition, such as, reaching critical temperatures that may cause failure of any of the hardware and/or software components. In this exemplary state, the thermal sensors 157 may be detecting or tracking temperatures that are at 50° C. or below. However, one of ordinary skill in the art will recognize that other temperature ranges may be established for the first and normal state 305 without departing from the scope of the invention.

The second policy state 310 may comprise a "quality of service" or "QoS" state in which the thermal policy manager 101 may increase the frequency in which thermal sensors 157 are polled or in which the thermal sensors 157 send their temperature status reports to the thermal policy manager 101. Increasing the frequency in which thermal sensors 157 are polled or in which the thermal sensors 157 send their temperature status reports helps the thermal policy manager 101 compensate for situations in which one or more thermal sensors 157 are not in direct contact with a region which is exhibiting high temperatures. The frequency in which temperature readings are received may be adjusted to compensate for thermal constants of different materials that may exist between a high thermal region and a particular thermal sensor 157.

The exemplary second state 310 may be reached or entered into by the thermal policy manager 101 when a significant change of temperature has been detected in the first, normal state 305. The threshold or magnitude of the change in temperature (delta T) which triggers this QoS state 310 may be adjusted or tailored according to a particular PCD 100. Therefore, while a PCD 100 may be operating in the first normal state 305, depending upon the magnitude of the change in temperature that is detected by one or more thermal sensors, the PCD 100 may leave the first normal state 305 and enter into the second QoS state 310 as tracked by the thermal policy manager 101.

For example, a PCD 100 may have a first maximum temperature reading from a given thermal sensor 157 of approximately 40° C. And a second reading from the same thermal sensor 157 may show a change in temperature of only 5° C. which takes the maximum temperature being detected to 45° C. However, while the maximum temperature being detected may be below an established threshold of 50° C. for the first, normal state 305, the change in temperature by 5° C. within a relatively short time frame may be significant enough for the thermal policy manager 101 to change the state to the second, QoS state 310.

In the second, QoS thermal state 310 the thermal policy manager 101 may request or it may actually perform one or more thermal mitigation techniques in order to reduce the thermal load and temperature of the PCD 100. In this particular second thermal state 310, the thermal policy manager 101 is designed to implement or request thermal mitigation techniques that may be barely perceivable by an operator and which may degrade a quality of service provided by the PCD 100 in a minimal fashion. The temperature range for this second, QoS thermal state 310 may comprise a range between about 50° C. to about 80° C. One of ordinary skill in the art will recognize that other temperature ranges may be established for the second, QoS state 305 and are within the scope of the invention. Further, one of ordinary skill in the art will recognize that other sub-states or sub-policies may be created and used relative to the current set described.

As noted previously, the second, QoS state 310 may be triggered based on the magnitude and/or location of the change in temperature and are not necessarily limited to the endpoints of a selected temperature range. Further details about this second, QoS thermal state 310 will be described below in connection with FIG. 4.

The third thermal state 315 may comprise a "severe" state in which the thermal policy manager 101 continues to monitor and/or receives interrupts from thermal sensors 157 while requesting and/or applying more aggressive thermal mitigation techniques relative to the second, QoS state 310 described above. This means that in this state the thermal policy manager 101 is less concerned about quality of service from the perspective of the operator.

In this third thermal state 315, the thermal policy manager 101 is more concerned about mitigating or reducing thermal load in order to decrease temperature of the PCD 100. The PCD 100 may have degradations in performance that are readily perceived or observed by an operator in this state 315. The third, severe thermal state 315 and its corresponding thermal mitigation techniques applied or triggered by the thermal policy manager 101 will be described in further detail below in connection with FIG. 4. The temperature range for this third, severe thermal state 310 may comprise a range between about 80° C. to about 100° C.

Similar to the first thermal state 305 and second thermal state 310 as discussed above, this third and severe thermal state 315 may be initiated based upon the change in temperature detected by one or more thermal sensors 157 and not necessarily limited to a temperature range established or mapped for this third thermal state 315. For example, as the arrows in this diagram illustrate, each thermal state may be initiated in sequence or they can be initiated out of sequence depending upon the magnitude of the change in temperature (delta T) over a certain amount of time that may be detected. So this means that the PCD 100 may leave the first and normal thermal state 305 and enter into or initiate the third and severe thermal state 315 based on a change in temperature that is detected by one or more thermal sensors 157, and vice versa.

Similarly, the PCD 100 may be in the second or QoS thermal state 310 and enter into or initiate the fourth or critical state 320 based on a change in temperature over an amount of time that is detected by one or more thermal sensors 157, and vice versa. In this exemplary third and critical state 320, the thermal policy manager 101 is applying or triggering as many and as sizable thermal mitigation techniques as possible in order to avoid reaching one or more critical temperatures that may cause permanent damage to the electronics contained within the PCD 100.

This fourth and critical thermal state 320 may be similar to conventional techniques that are designed to eliminate functionality and operation of a PCD 100 in order to avoid critical temperatures. The fourth thermal state 320 may comprise a "critical" state in which the thermal policy manager 101 applies or triggers the shutting down of non-essential hardware and/or software. The temperature range for this fourth thermal state may include those of about 100° C. and above. The fourth and critical thermal state 320 will be described in further detail below in connection with FIG. 4.

The thermal policy management system is not limited to the four thermal states 305, 310, 315, and 320 illustrated in FIG. 3. Depending upon a particular PCD 100, additional or fewer thermal states may be provided without departing from the scope of the invention. That is, one of ordinary skill in the art recognizes that additional thermal states may improve functionality and operation of a particular PCD 100 while in other situations, fewer thermal states may be preferred for a particular PCD 100 that has its own unique hardware and/or software.

FIG. 4 is a diagram illustrating exemplary thermal mitigation techniques that may be applied or ordered by the thermal policy manager 101 and are dependent upon a particular thermal state of a PCD 100. As noted previously, the first thermal state 305 may comprise a "normal" state in which the thermal policy manager 101 being executed by the CPU 110 and partially by the ADC controller 103 may monitor, poll, or receive one or more status reports on temperature from one or more thermal sensors 157 as illustrated in FIG. 2A. In this first thermal state 305, a PCD 100 may not be in any danger or risk of reaching a critical temperature that may harm one or more software and/or hardware components within the PCD 100. Usually, in this first thermal state, the thermal policy manager 101 is not applying or has not requested any initiation of thermal mitigation techniques such that the PCD 100 is operating at its fullest potential and highest performance without regard to thermal loading. The temperature range for this first thermal state 305 may include those of 50° C. and below. For this first thermal state 305, the thermal policy manager 101 may reside in the ADC controller 103 while the main thermal policy manager 101 for all other states may reside or be executed by the CPU 110. In an alternate exemplary embodiment, the thermal policy manager 101 may reside only in the CPU 110.

In the second thermal state 310 also referred to as the QoS state 310, once it is initiated, the thermal policy manager 101 may begin more rapid monitoring, polling, and/or receiving of interrupts (relative to the first thermal state 305) from thermal sensors 157 regarding current temperature of the PCD 100. In this exemplary second thermal state 310, the thermal policy manager 101 may initiate or request the monitor module 114 and/or operating system ("O/S") module 207 of FIG. 2A to start applying thermal mitigation techniques but with the objective to maintain high-performance with little or no degradations to the quality of service as perceived by the operator of the PCD 100.

According to this exemplary second thermal state 310 illustrated in FIG. 4, the thermal policy manager 101 may request the monitor 114 and/or the O/S module 207 to initiate thermal mitigation techniques such as, but not limited to, (1) load scaling and/or (2) load dynamic scaling; and (3) spatial load shifting. Load scaling may comprise adjusting or "scaling" the maximum clock frequency allowed in DVFS algorithm, such as the values provided in the first table 267 of FIG. 2C. Such an adjustment may limit the maximum heat dissipation. This thermal load mitigation technique may also involve adjusting the voltage to match the standard DVFS table used for a particular and unique PCD 100.

The thermal load mitigation technique of load dynamic scaling may comprise the scaling of one and/or all of the N application processor cores 222, 224, and 230. This thermal load mitigation technique may comprise establishing the max clock frequency allowed for the DVFS algorithm of a particular core 222, 224, or 230. The DVFS algorithm will use a table of voltage/frequency pairs, such as the second table 277 illustrated in FIG. 2D, to scale processing capability.

One such dynamic scaling technique includes limiting the number of millions of instructions per second (MIPS) by limiting the max frequency allowed. In this way, the thermal policy manager 101 is effectively limiting the power consumption of the core(s) 222, 224, and 230 and limiting their capability (MIPS) that is available. The thermal policy manager 101 may choose to limit N cores 222, 224, 230 together, or it can select and chose which cores 222, 224, 230 get scaled back while allowing other cores 222, 224, 230 to operate in an unconstrained manner. The thermal policy manager 101, monitor module 114, and/or O/S module 207 may make their decisions on which cores 222, 224, 230 to control based on data received from thermal sensors 157 or software application requirements [[based]], and/or best effort prediction. The temperature range for this second thermal state may include those of about 50° C. to about 80° C.

The thermal load mitigation technique of spatial load shifting comprises the activation and deactivation of cores within a multicore processor system. If N multiple cores exist, each core may be loaded up with work or its performance maximized using up to N−1 cores and then as a thermal sensor 157 indicates a heating problem, the location of an inactive core functioning as a cooling device may be shifted. Each core may effectively be cooled by letting it idle in a predetermined pattern or in a pattern dictated by thermal measurements. A MIPS hole is effectively moved around the cores in the course of several seconds to cool them. In this way, several GHz of processing power may be made available to a PCD 100, while still cooling the silicon die by moving the load around. Further details of spatial load shifting will be described below in connection with FIGS. 8A-8B.

Referring now to the third thermal state 315 of FIG. 4, also known as the severe thermal state 315, the thermal policy manager 101 may start continuous monitoring, polling, or receiving interrupts from thermal sensors 157 so that temperature is sensed more continuously/frequently compared to the second lower thermal state 310. In this exemplary thermal state 315, the thermal policy manager 101 may apply or request that the monitor module 114 and/or O/S module 207 apply more aggressive thermal mitigation techniques and/or additional thermal mitigation techniques (relative to the second thermal state 310) with probable perceivable degradation of performance observed by an operator of the PCD 100.

According to this exemplary third thermal state 315, the thermal policy manager 101 may cause reduction in power to one or more hardware devices like amplifiers, processors, advanced receiver hardware, etc.

The thermal policy manager 101 may also shift workloads among different hardware devices in a spatial manner in order to bring active devices off-line and to bring in active devices on-line. The thermal mitigation techniques of this third and severe thermal state 315 may be the same as those described above with respect to the second, quality of service thermal state 310. However, these same thermal mitigation techniques may be applied in a more aggressive manner.

For example, when adjusting DVFS parameters, the thermal policy manager 101 may request that these parameters are adjusted more significantly such as providing for significantly lower voltages and/or frequencies compared to the second thermal state 310. These lower voltages and/or frequencies may be lower than is recommended for supporting a particular application program which may degrade performance.

Referring now to the fourth and critical state 320 of FIG. 4, the thermal policy manager 101 may start shutting down or requesting the monitor 114 and/or O/S module 207 to start shutting down all nonessential hardware and/or software modules.

"Nonessential" hardware and/or software modules may be different for each type of particular PCD 100. According to one exemplary embodiment, all nonessential hardware and/or software modules may include all of those outside of an emergency 911 telephone call function and global positioning satellite ("GPS") functions. This means that the thermal policy manager 101 in this fourth, critical thermal state 320 may cause the shutdown of hardware and/or software modules that are outside of emergency 911 telephone calls and GPS functions. The thermal policy manager 101 may shut down modules in sequence and/or in parallel depending upon the critical temperatures being monitored by the thermal sensors 157, locations of the thermal sensors 157, and the change in temperature being observed by the thermal policy manager 101. The temperature range for this fourth thermal state 320 may include those of about 100° C. and above.

Figure 5:
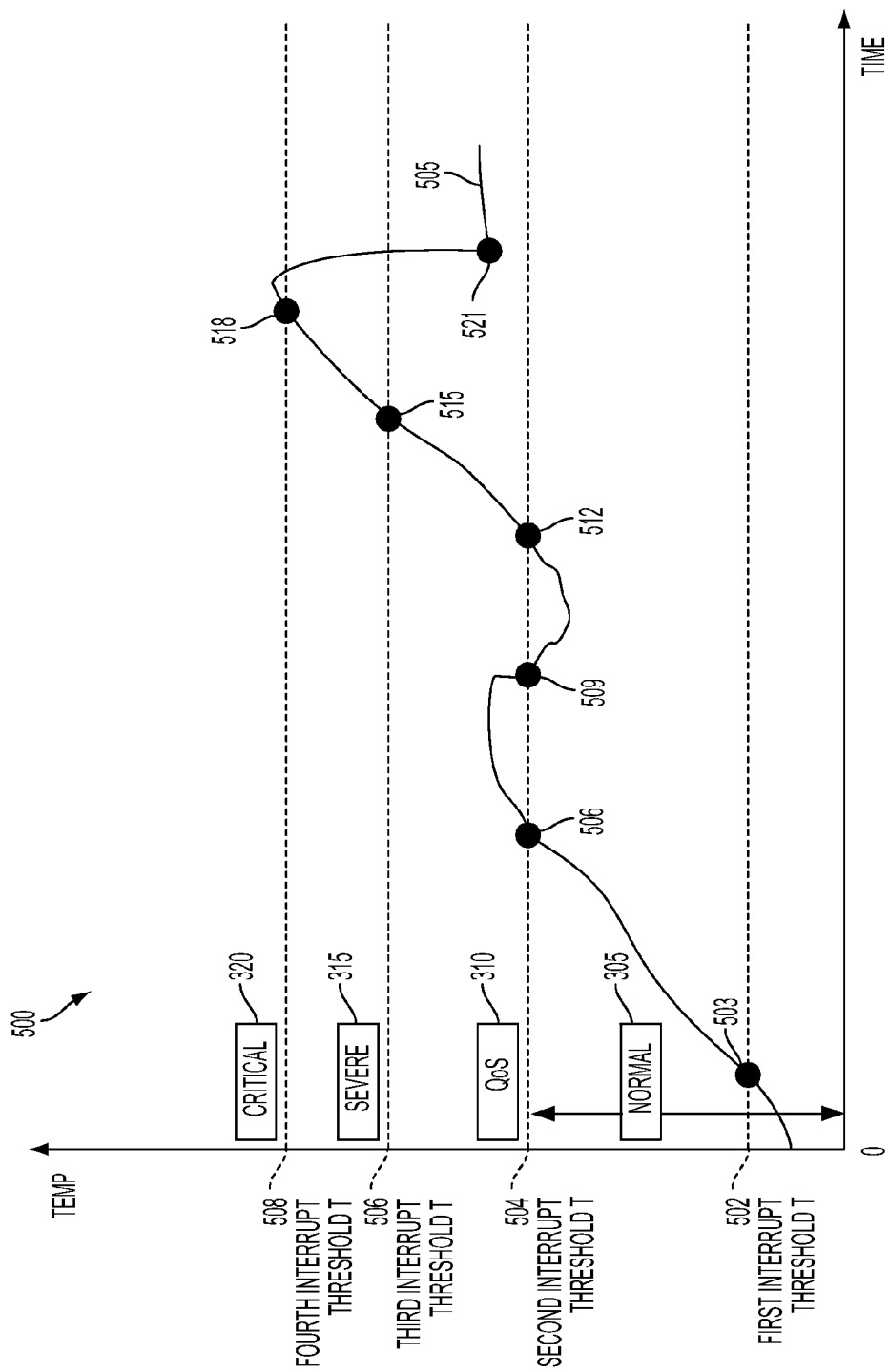
FIG. 5 is a diagram illustrating an exemplary graph of temperature versus time and corresponding thermal policy states.

FIG. 5 is a diagram illustrating an exemplary graph 500 of temperature versus time and corresponding thermal policy states 305, 310, 315, and 320. At the first point 503 of the temperature plot or line 505, the thermal policy manager 101 may receive a first interrupt temperature reading of 40° C. from one or more thermal sensors 157. Since this first temperature reading of 40° C. may be below the maximum temperature of 50° C. set for the normal thermal state 305, then the thermal policy manager 101 may remain in the first or normal thermal state 305.

At a second point 506 along the temperature line 505, the thermal policy manager 101 may receive a second interrupt temperature reading of 50° C. While 50° C. may be within the selected temperature range for the first thermal state 305, if the change in temperature from the last temperature reading was significant, such as a large temperature change within a short period of time (like a 3° C. change within five seconds), then such a change or jump in temperature may trigger the thermal policy manager 101 to leave the normal thermal state 305 and initiate the second, QoS thermal state 310.

Between the second point 506 and third point 509 of the temperature line 505, the temperature of the PCD 100 was above 50.degree. C. and the thermal policy manager 101 may have requested or activated one or more thermal mitigation techniques in order to lower the temperature of the PCD 100. At the third point 509 of the temperature line 505, the thermal policy manager 101 may change the thermal state of the PCD 100 from the second state 310 to the first and normal state 305.

At the fourth point 512, the thermal policy manager 101 may observe that the temperature trend is moving in an upward fashion or, in other words, the temperature line 505 may have a positive slope or change in delta T. The thermal policy manager 101 may change the thermal state of the PCD 100 in view of this data from the first thermal state 305 to the second, QoS thermal state 310. In the second thermal state 310, the thermal policy manager 101 may request or it may activate one or more thermal mitigation techniques that should not significantly impact the quality of service provided by the PCD 100. The second thermal state 310 may include a temperature range between a temperature of about 50° C. to about 80° C.

Moving along the temperature line 505 to the fifth point 515 which has a magnitude of about 80° C., the thermal policy manager 101 may initiate a change of thermal state from the second, QoS thermal state 310 to the third and severe thermal state 315. As noted previously, the temperature range for this first thermal state may include a range between about 80° C. to about 100° C. In this third and severe thermal state 310, the thermal policy manager 101 may be requesting or activating a plurality of thermal mitigation techniques that may impact the quality of service and performance of the PCD 100.

The segment of the temperature line 505 between the fifth point 515 and sixth point 518 reflects that the third and severe thermal state 310 has been unsuccessful in mitigating the temperature rise within the PCD 100. Therefore, at the sixth point 518 which may have a magnitude of approximately 100° C., the thermal policy manager 101 may enter into the fourth and critical state 320. In this fourth and critical state 320, the thermal policy manager 101 may activate or request that certain hardware and/or software components be shut down in order to alleviate the current thermal load. As noted previously, the thermal policy manager 101 may cause any hardware and/or software component outside of emergency 911 call functions and GPS functions to be shut down while in this fourth thermal state 320.

Moving along the temperature line 505 to the seventh point 521, the segment of the line 505 between the sixth point 518 and seventh point 521 reflects that the critical thermal state 320 and severe thermal state 315 were successful in lowering the temperature of the PCD 100. As noted previously, one or more thermal states may be jumped or skipped depending upon the temperature measured by the thermal sensors 157 and observed by the thermal policy manager 101. Further, when returning to lower thermal states, the thermal states followed by the thermal policy manager 101 may be similar to a hysteresis.

Figure 6A:
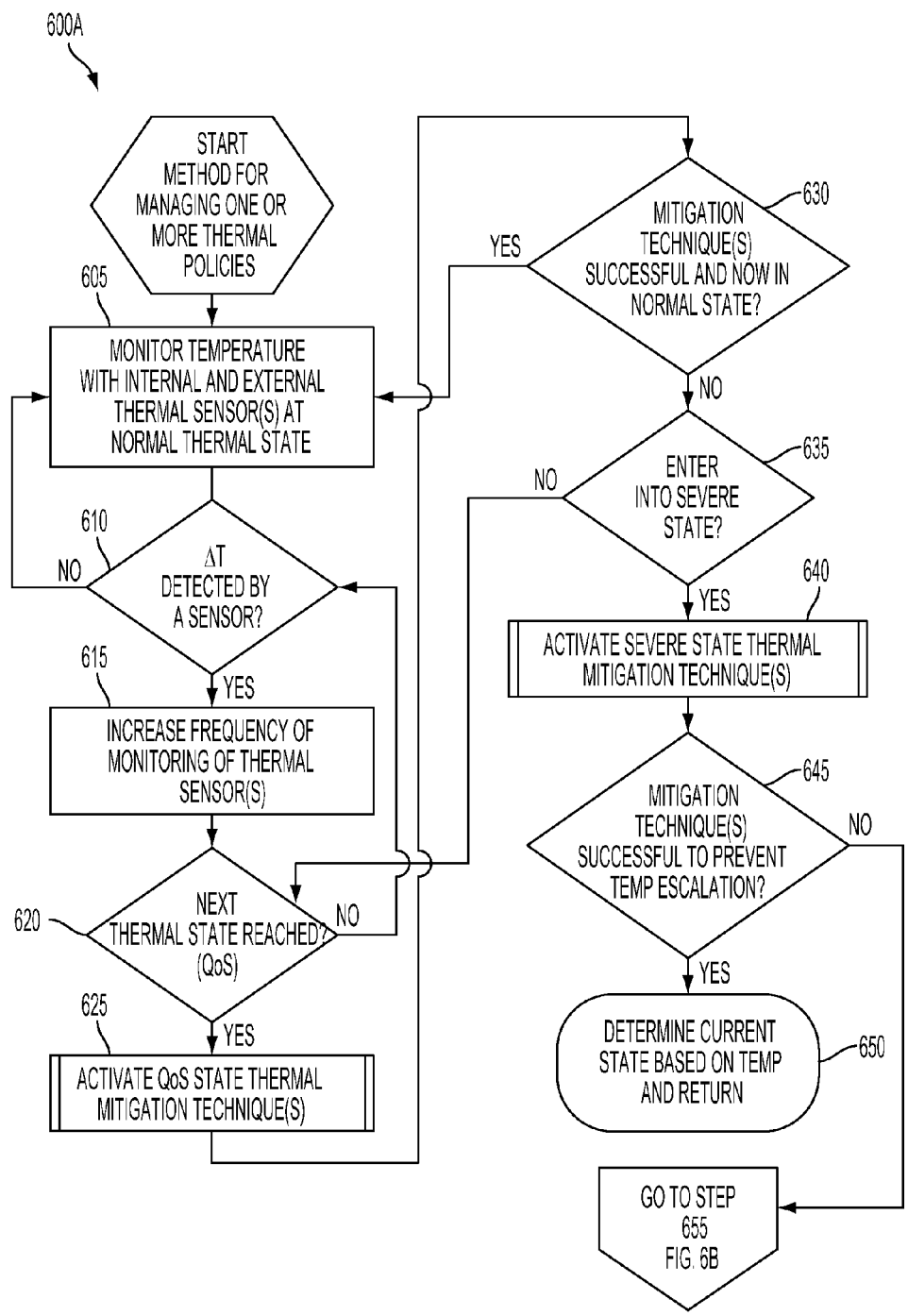
FIGS. 6A-6B are logical flowcharts illustrating a method for managing one or more thermal policies.
Figure 6B:
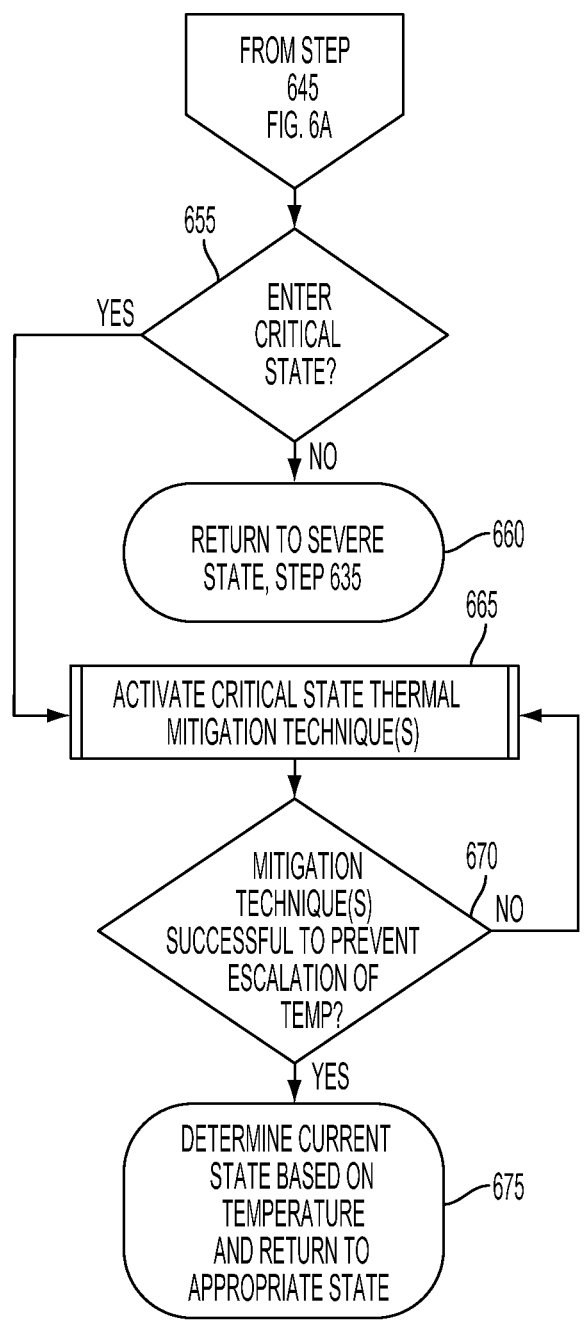

FIGS. 6A-6B are logical flowcharts illustrating a method 600 for managing one or more thermal policies of a PCD 100. Method 600A of FIG. 6A starts with first block 605 in which the thermal policy manager 101 may monitor temperature with internal and external thermal sensors 157 while in a first thermal state 305. This first block 605 generally corresponds with the first thermal state 305 illustrated in FIGS. 3-4. As noted previously, the thermal policy manager 101 may monitor, actively poll, and/or receive interrupts from one or more thermal sensors 157. In this particular thermal state, the thermal policy manager 101 does not apply any thermal mitigation techniques. The PCD 100 may perform at its optimal level without regard to any thermal loading conditions in this first thermal state 305.

Next, in decision block 610, the thermal policy manager 101 may determine if a temperature change (delta T) or change in absolute temperature has been detected by one or more thermal sensors 157. If the inquiry to decision block 610 is negative, then the "NO" branch is followed back to block 605. If the inquiry to decision block 610 is positive, then the "YES" branch is followed to block 615 in which the thermal policy manager 101 may increase the frequency of the monitoring of the thermal sensors 157. In block 615, the thermal policy manager may actively poll the thermal sensors 157 more frequently or it may request the thermal sensors 157 to send more frequent interrupts that provide temperature data. This increased monitoring of thermal sensors 157 may occur in the first or normal state 305 and it may also occur in the second or quality of service thermal state 310.

Alternatively, block 615 may be moved altogether to after block 620. In this way, the increase thermal monitoring of sensors 157 would occur only if the next thermal state, the QoS state, has been reached. As will be described below, the method is not limited to the specific sequence of each of the described embodiments as understood by one of ordinary skill in the art.

Next, in decision block 620, the thermal policy manager 101 may determine if the next thermal state has been reached or achieved by the PCD 100. In this decision block 620, the thermal policy manager 101 may be determining if the temperature range assigned to the second thermal state 310 has been achieved. Alternatively, the thermal policy manager in this decision block 620 may be determining if a significant change in temperature (delta T) over time has occurred since a last reading.

If the inquiry to decision block 620 is negative, then the "NO" branch is followed back to decision block 610. If the inquiry to decision block 620 is positive, then the "YES" branch is followed to routine or submethod 625. Routine or submethod 625 may comprise a second thermal state 310 also referred to as the QoS state 310 in which thermal policy manager 101 may apply or request one or more thermal mitigation techniques described above in connection with FIG. 4. For example, the thermal policy manager 101 may request the monitor 114 and/or the O/S module 207 to initiate thermal mitigation techniques such as, but not limited to, (1) load scaling and/or (2) load dynamic scaling as described above.

Subsequently, in decision block 630, the thermal policy manager 101 may determine if the one or more thermal mitigation techniques of the second or QoS state 310 were successful and if the current temperature as detected by the one or more thermal sensors 157 falls within the next lower thermal range for the first or normal state 305. If the inquiry to decision block 630 is positive, then the "YES" branch is followed back to block 605. If the inquiry to decision block 630 is negative, then the "NO" branch is followed to decision block 635.

In decision block 635, the thermal policy manager 101 may determine if the PCD 100 has now entered into the third or severe thermal state 315 according to the temperature as detected by the one or more thermal sensors 157. Alternatively, the thermal policy manager 101 may determine if the PCD 100 has entered into the third or severe thermal state 315 by determining if a significant change in temperature (delta T) has occurred.

If the inquiry to decision block 635 is negative, the "NO" branch is followed back to decision block 620. If the inquiry to decision block 635 is positive, then the "YES" branch is followed to submethod or subroutine 640.

In submethod or subroutine 640, the thermal policy manager 101 has determined that the PCD 100 has entered into the third or severe thermal state. The thermal policy manager 101 may then activate or request that one or more thermal mitigation techniques be applied. As noted previously, the thermal policy manager 101 in this third or severe thermal state 315 may start continuous monitoring, polling, or receiving interrupts from thermal sensors 157 so that temperature is sensed more continuously/frequently compared to the second lower thermal state 310.

In this exemplary third thermal state 315, the thermal policy manager 101 may apply or request that the monitor module 114 and/or O/S module 207 apply more aggressive thermal mitigation techniques and/or additional thermal mitigation techniques (relative to the second thermal state 310) with probable perceivable degradation of performance observed by an operator of the PCD 100. According to this exemplary thermal state 315, the thermal policy manager 101 may cause reduction in power to one or more hardware devices like amplifiers, processors, advanced receiver hardware, etc.

The thermal policy manager 101 may also shift workloads among different hardware devices in a spatial manner in order to bring active devices off-line and to bring in active devices on-line. The thermal mitigation techniques of this third and severe thermal state 315 may be the same as those described above with respect to the second, quality of service thermal state 310. However, these same thermal mitigation techniques may be applied in a more aggressive manner. For example, when adjusting DVFS parameters, the thermal policy manager 101 may request that these parameters are adjusted more significantly such as providing for significantly lower voltages and/or frequencies compared to the second thermal state 310. These lower voltages and/or frequencies may be lower than is recommended for supporting a particular application program.

Next, in decision block 645, the thermal policy manager 101 may determine if the one or more thermal mitigation techniques applied in submethod or routine 640 were successful to prevent escalation of temperature for the PCD 100. If the inquiry to decision block 645 is negative, then the "NO" branch is followed to step 655 of FIG. 6B. If the inquiry to decision block 645 is positive, then the "YES" branch is followed to step 650 in which the thermal policy manager 101 determines the current thermal state of the PCD 100 based on temperature readings provided by the one or more thermal sensors 157.

Referring now to FIG. 6B, this FIG. is a continuation flow chart relative to the flowchart illustrated in FIG. 6A. The method 600B of FIG. 6B starts with decision block 655 in which the thermal policy manager 101 may determine if the PCD 100 has entered into the fourth or critical thermal state 320 based on the temperature being detected by one or more thermal sensors 157. If the inquiry to decision block 655 is negative, then the "NO" branch is followed to step 660 in which the thermal policy manager 101 returns the PCD 102 the third or severe thermal state 315 and the process returns to block 635 of FIG. 6A.

If the inquiry to decision block 655 is positive, then the "YES" branch is followed to submethod or routine 665 in which the thermal policy manager 101 activates or request that one or more critical thermal mitigation techniques be activated. The thermal policy manager 101 in this fourth, critical thermal state 320 may cause the shutdown of hardware and/or software modules that are outside of emergency 911 telephone calls and GPS functions. The thermal policy manager 101 may shut down modules in sequence and/or in parallel depending upon the critical temperatures being monitored by the thermal sensors 157 and the change in temperature being observed by the thermal policy manager 101.

Subsequently, in decision block 670, the thermal policy manager 101 may determine if the thermal mitigation techniques applied in routine or submethod 665 were successful to prevent any escalation of temperature of the PCD 100 as detected by the thermal sensors 157. If the inquiry to decision block 670 is negative, then the "NO" branch is followed back to routine or submethod 665.

If the inquiry to decision block 670 is positive, then the "YES" branch is followed to step 675 in which the thermal policy manager 101 determines the current thermal state of the PCD 100 based on temperature readings supplied by one or more thermal sensors 157. Once the temperature readings are assessed by the thermal policy manager 101, the thermal policy manager 101 initiates (or returns to) the thermal state corresponding to the temperature ranges detected by the thermal sensors 157.

Figure 7:
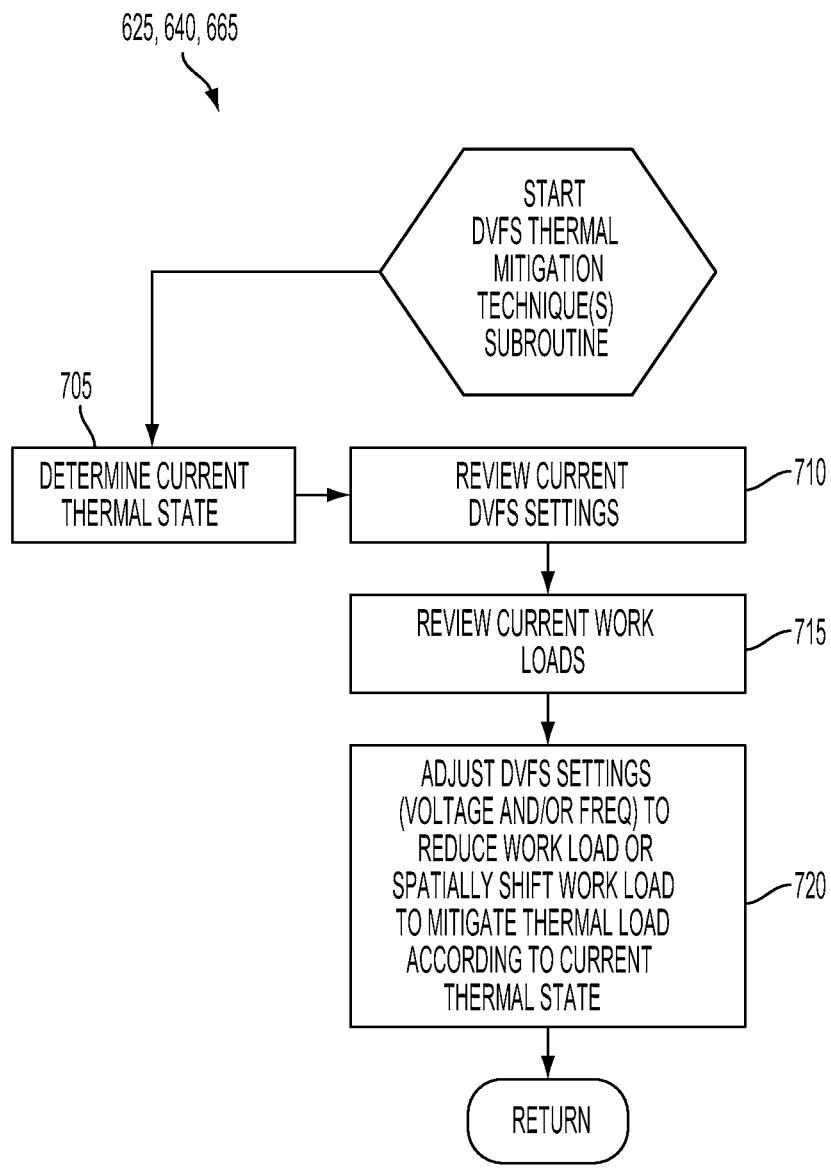
FIG. 7 is a logical flowchart illustrating a sub-method or subroutine for applying DVFS thermal mitigation techniques.

FIG. 7 is a logical flowchart illustrating sub-method or subroutines 625, 640, and 665 for applying DVFS thermal mitigation techniques. Block 705 is the first step in the submethod or subroutine for applying DVFS thermal mitigation techniques. In this first block 705, the thermal policy manager 101 may determine the current thermal state based on temperature readings provided by thermal sensors 157. Once the current thermal state is determined by the thermal policy manager 101, the thermal policy manager 101 may then review the current DVFS settings in block 710. Next, in block 715, the thermal policy manager 101 may review the current workloads of one or more hardware and/or software modules.

Next, in block 720, the thermal policy manager 101 may adjust or issue commands to adjust the current DVFS settings that may include voltage and/or frequency, in order to reduce workload or to spatially shift the workload to mitigate thermal loading conditions according to the current thermal state which was determined by the thermal policy manager 101.

So for the second or QoS thermal state 310, in block 720, the thermal policy manager 101 may initiate or request the monitor module 114 and/or operating system ("O/S") module 207 of FIG. 2A to start applying thermal mitigation techniques but with the objective to maintain high-performance with little or no perception in degradations to the quality of service as perceived by the operator of the PCD 100.

According to this exemplary second thermal state 310 illustrated in FIG. 4, the thermal policy manager 101 may request the monitor 114 and/or the O/S module 207 to initiate thermal mitigation techniques such as, but not limited to, (1) load scaling and/or (2) load dynamic scaling. Load scaling may comprise adjusting or "scaling" the maximum clock frequency allowed in DVFS algorithm.

For the third or severe terminal state 315, in block 720, the thermal policy manager 101 may start continuous monitoring, polling, or receiving interrupts from thermal sensors 157 so that temperature is sensed more continuously/frequently compared to the second lower thermal state 310. In this exemplary thermal state 315, the thermal policy manager 101 may apply or request that the monitor module 114 and/or O/S module 207 more aggressive thermal mitigation techniques and/or additional thermal mitigation techniques (relative to the second thermal state 310) with probable perceivable degradation of performance observed by an operator of the PCD 100. According to this exemplary thermal state 315, the thermal policy manager 101 may cause reduction in power to one or more hardware devices like amplifiers, processors, advanced receiver hardware, etc.

The thermal policy manager 101 may also shift workloads among different hardware devices in a spatial manner in order to bring active devices off-line and to bring in active devices on-line. The thermal mitigation techniques of this third and severe thermal state 315 may be the same as those described above with respect to the second, quality of service thermal state 310. However, these same thermal mitigation techniques may be applied in a more aggressive manner. For example, when adjusting DVFS parameters, the thermal policy manager 101 may request that these parameters are adjusted more significantly such as providing for significantly lower voltages and/or frequencies compared to the second thermal state 310. These lower voltages and/or frequencies may be lower than is recommended for supporting a particular application program.

For the fourth or critical terminal state 320, in block 720, this thermal state 320 may be similar to conventional techniques that are designed to eliminate functionality and operation of a PCD 100 in order to avoid critical temperatures. The fourth thermal state 320 may comprise a "critical" state in which the thermal policy manager 101 applies or triggers the shutting down of non-essential hardware and/or software. The temperature range for this fourth thermal state may include those of about 100° C. and above. The submethod 625, 640, or 665 then returns to an appropriate step in the thermal management method 600 depending upon the current thermal state of the PCD 100.

Figure 8A:
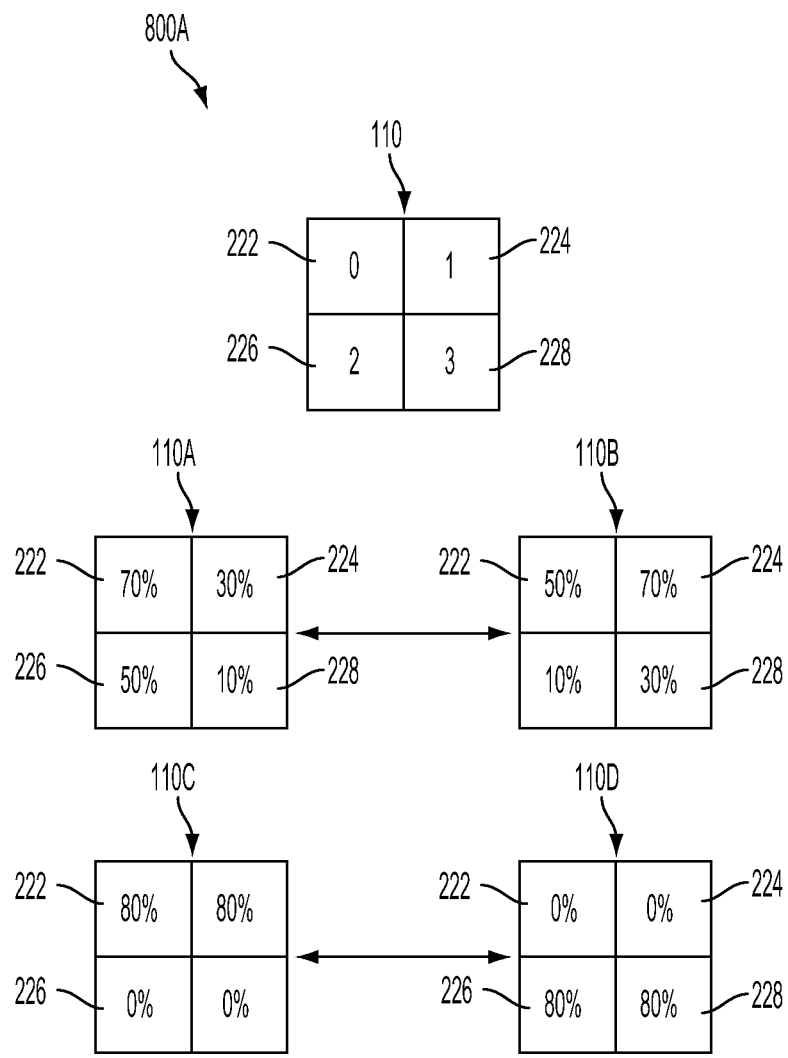
FIG. 8A is a schematic for a four-core multicore processor and different workloads that may be spatially managed with the multicore processor.

FIG. 8A is a schematic 800A for a four-core multicore processor 110 and different workloads that may be spatially managed with the multicore processor 110. While only four cores are illustrated, one of ordinary skill in the art recognizes that additional cores may be employed and are within the scope of the invention.

The four-core multicore processor 110 has a zeroth core 222, a first core 224, a second core 226, and a third core 228. The first workload scenario for the multicore processor 110 is demonstrated by multicore processor 110A in which the zeroth core 222 has a workload of 70% (out of a 100% full work capacity/utilization for a particular core), while the first core 224 has a workload of 30%, the second core 226 has a workload of 50%, and the third core 228 has a workload of 10%.

If the thermal policy manager 101 enters into any one of the thermal states 310, 315, 320 described above in which thermal mitigation techniques are applied to the PCD 100, a spatial thermal load mitigation technique as illustrated in this FIG. 8A may be implemented. According to this spatial thermal load mitigation technique, the thermal policy manager 101, the monitor module 114, and/or the O/S module 207 may shift the workload of one core in a multicore processor 110 to one or more other cores.

In the exemplary embodiment illustrated in FIG. 8A, the workload of the zeroth core 222 may be shifted such that additional work is performed by the remaining three other cores of the multicore processor 110. Multicore processor 110B illustrates such a shift in that 20% of the workload for the zeroth core 222 and 40% of the workload for the second core 226 were transferred among the remaining two cores. The workload experienced by the zeroth core 222 was reduced down to 50% while the workload experienced by the second core 226 was reduced down to 10%. Meanwhile, the workload of the first core 224 was increased to 70% while the workload of the third core 228 was increased to 30%. One of ordinary skill in the art recognizes that other magnitudes and combinations of shifting workload and corresponding work load percentages are well within the scope of the invention.

The multicore processors 110C-110D provide a demonstration of an exemplary shift of a "hole" in which one or more cores may effectively be cooled by letting them idle in a predetermined pattern or in a pattern dictated by thermal measurements. A 'hole' or core that is not being utilized is effectively moved in MIPS around a group of cores to cool them in the course of several seconds. In the exemplary embodiment illustrated by multicore processor 110C of FIG. 8A, the zeroth core 222 and the first core 224 may have exemplary workloads of 80% while the second core 226 and the third core 228 have no loads whatsoever. In this scenario, if either or both of the zeroth core 222 and first core 224 reach the second thermal stage 310, the third thermal stage 315, or the fourth thermal states 320, then the thermal policy manager 101 may apply or request that a spatial thermal load mitigation technique be applied in which all of the workload of the two active cores 222, 224 be shifted to the two inactive cores 226, 228. The fourth processor 110D demonstrates such a shift in which the zeroth core 222 and first core 224 no longer have any workloads while the second core 226 and third core 228 have assumed the previous workload which was managed by the zeroth core 222 and first core 224.

Figure 8B:
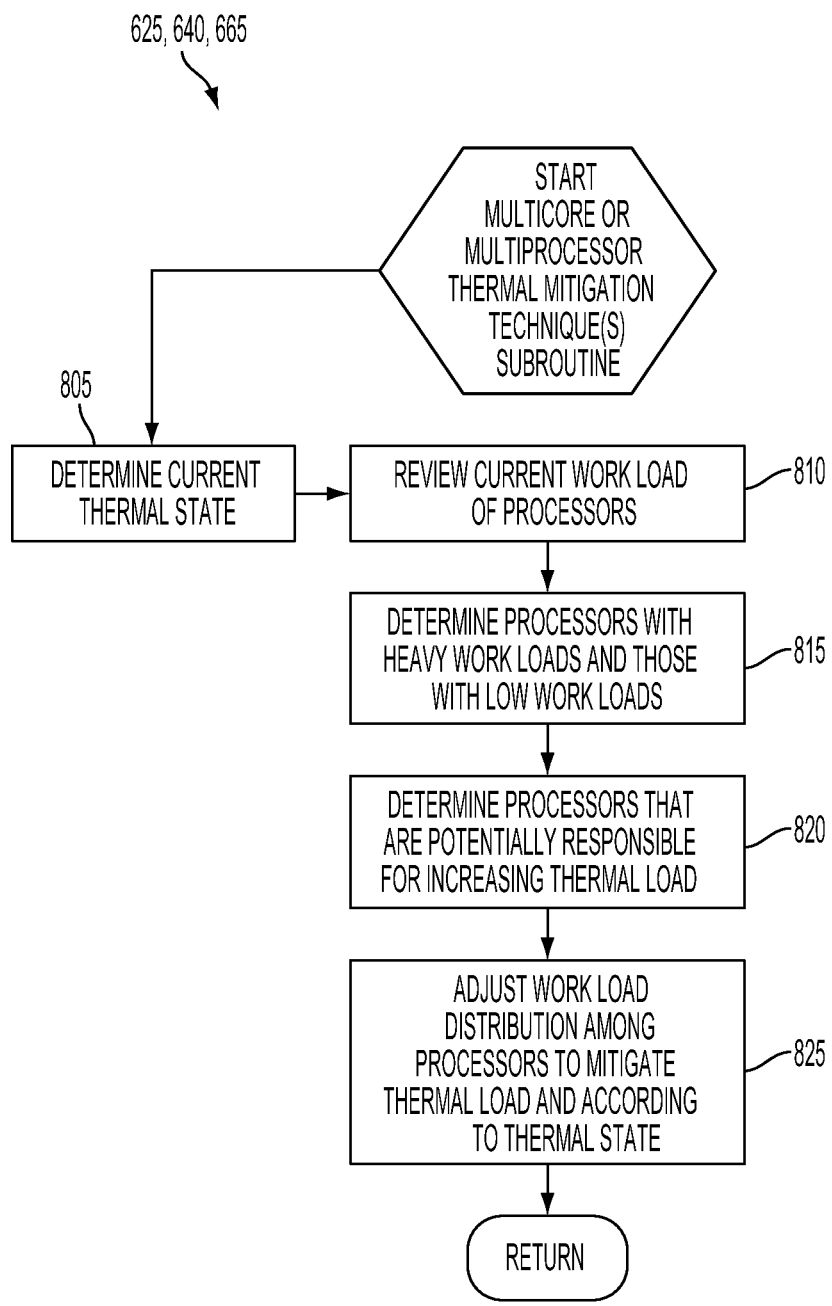
FIG. 8B is logical flowchart illustrating a sub-method or subroutine for applying spatial workload shifting thermal mitigation techniques.

FIG. 8B is logical flowchart illustrating a sub-method or subroutine 625,640,665 for applying spatial workload shifting thermal mitigation techniques. Block 805 is the first step in the submethod or subroutine 625, 640, 665 for applying spatial workload shifting thermal mitigation techniques. In this first block 805, the thermal policy manager 101 may determine the current thermal state based on temperature readings provided by thermal sensors 157. Once the current thermal state is determined by the thermal policy manager 101, the thermal policy manager 101, the monitor module 114, and/or the O/S module 207 may then review the current workload of the cores of a multicore processor 110 in block 810. As noted previously, the thermal policy manager 101 may be tasked with implementing one or more thermal mitigation techniques.

However, in an alternate exemplary embodiments, it is possible for the thermal policy manager 101 to only suggest that thermal mitigation techniques be applied and the thermal policy manager 101 may allow the monitor module 114 and/or the O/S module to decide how the thermal mitigation techniques are actually implemented. For brevity, the remainder of this subroutine 625, 640, 665 will reference the embodiment in which the thermal policy manager 101 actually implements the thermal mitigation techniques.

Next, in block 815, the thermal policy manager 101 may determine which cores are experiencing heavy workloads and those cores which are experiencing little or no workloads. In block 820, the thermal policy manager 101 may determine which processors that are potentially responsible for contributing to or causing the thermal loading condition and the current thermal state. Subsequently, in block 825, the thermal policy manager 101 may adjust the spatial workload distribution among the cores of a multicore processor 110 to mitigate thermal load and in accordance with the current thermal state. Block 825 generally corresponds to the spatial shifting thermal mitigation technique illustrated in FIG. 8A. The submethod 625, 640, or 665 then returns to an appropriate step in the thermal management method 600 depending upon the current thermal state of the PCD 100.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figs. which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for managing one or more thermal policies of a portable computing device comprising a chip, the method comprising:

defining at least a first predetermined thermal state and a second predetermined thermal state, each predetermined thermal state being associated with a respective temperature range and a respective thermal policy, wherein:
  the highest temperature of a first temperature range associated with the first predetermined thermal state is equal to or less than the lowest temperature of a second temperature range associated with the second predetermined thermal state;
  a thermal policy comprises one or more thermal mitigation techniques;
  application of a thermal policy by way of one or more of its thermal mitigation techniques reduces available functionality of the portable computing device; and
  a first thermal policy associated with the first predetermined thermal state reduces functionality of the portable computing device to a first reduced level relative to an initial level and a second thermal policy associated with the second predetermined thermal state reduces functionality of the portable computing device to a second reduced level relative to the first reduced level;
monitoring temperature of the portable computing device by receiving temperature measurements from one or more thermal sensors;
determining if the portable computing device has achieved one of the first and second predetermined thermal, states by comparing a recently received temperature measurement to a previously received temperature measurement and the respective temperature ranges associated with the first and second predetermined thermal states, wherein achieving one of the first and second predetermined thermal states is determined by recognizing that the recently received temperature measurement is indicative of a change in temperature of a predetermined magnitude relative to the previously received temperature measurement;
if the portable computing device has achieved the first predetermined thermal state, then initiating one or more first thermal mitigation techniques comprised in the respective thermal policy associated with the first predetermined thermal state in order to reduce temperature of the portable computing device as well as reduce functionality to the first reduced level; and
if the portable computing device has achieved the second predetermined thermal state, then initiating one or more second thermal mitigation techniques comprised in the respective thermal policy associated with the second predetermined thermal state in order to reduce temperature of the portable computing device as well as reduce functionality to the second reduced level.

2. The method of claim 1, wherein the one or more thermal sensors comprises at least one of an internal, on-chip thermal sensor and an external, off-chip thermal sensor.

3. The method of claim 2, further comprising positioning a thermal sensor adjacent to hardware and on a same surface with the hardware within the portable computing device, and for each thermal policy assigning one or more thermal mitigation techniques to the hardware based on an association between the thermal sensor and the hardware.

4. The method of claim 1, further comprising increasing a frequency in which temperature measurements are received when at least one of the first and second predetermined thermal states is achieved.

5. A computer system for managing one or more thermal policies of a portable computing device comprising a chip, the system comprising:
  a monitor module operable to:
    monitor temperature of the portable computing device by receiving temperature measurements from one or more thermal sensors;
  a thermal policy manager operable to:
    define at least a first predetermined thermal state and a second predetermined thermal state, each predetermined thermal state being associated with a respective temperature range and a respective thermal policy, wherein:
      the highest temperature of a first temperature range associated with the first predetermined thermal state is equal to or less than the lowest temperature of a second temperature range associated with the second predetermined thermal state;
    a thermal policy comprises one or more thermal mitigation techniques;
    application of a thermal policy by way of one or more of its thermal mitigation techniques reduces available functionality of the portable computing device; and
    a first thermal policy associated with the first predetermined thermal state reduces functionality of the portable computing device to a first reduced level relative to an initial level and a second thermal policy associated with the second predetermined thermal state reduces functionality of the portable computing device to a second reduced level relative to the first reduced level;
    determine if the portable computing device has achieved one of the first and second predetermined thermal states by comparing a recently received temperature measurement to a previously received temperature measurement and the respective temperature ranges associated with the first and second predetermined thermal states, wherein achieving one of the first and second predetermined thermal states is determined by recognizing that the recently received temperature measurement is indicative of a change in temperature of a predetermined magnitude relative to the previously received temperature measurement;
    initiate one or more first thermal mitigation techniques comprised in the respective thermal policy associated with the first predetermined thermal state in order to reduce temperature of the portable computing device as well as reduce functionality to the first reduced level, if the portable computing device has achieved the first predetermined thermal state; and
    initiate one or more second thermal mitigation techniques comprised in the respective thermal policy associated with the second predetermined thermal state in order to reduce temperature of the portable computing device as well as reduce functionality to the second reduced level, if the portable computing device has achieved the second predetermined thermal state.

6. The system of claim 5, wherein the one or more thermal sensors comprise at least one of an internal, on-chip thermal sensor and an external, off-chip thermal sensor.

7. The system of claim 5, wherein the monitor module is further operable to increase a frequency in which temperature measurements are received when at least one of the first and second predetermined thermal states is achieved.

8. The system of claim 5, wherein the thermal policy manager is further operable to assign one or more thermal mitigation techniques for each thermal policy to hardware based on an association between the thermal sensor and the hardware, the thermal sensor being positioned adjacent to the hardware and on a same surface with the hardware within the portable computing device.

9. A computer system for managing one or more thermal policies of a portable computing device comprising a chip, the system comprising:
    means for defining at least a first predetermined thermal state and a second predetermined thermal state, each predetermined thermal state being associated with a respective temperature range and a respective thermal policy, wherein:
        the highest temperature of a first temperature range associated with the first predetermined thermal state is equal to or less than the lowest temperature of a second temperature range associated with the second predetermined thermal state;
        a thermal policy comprises one or more thermal mitigation techniques;
        application of a thermal policy by way of one or more of its thermal mitigation techniques reduces available functionality of the portable computing device; and
        a first thermal policy associated with the first predetermined thermal state reduces functionality of the portable computing device to a first reduced level relative to an initial level and a second thermal policy associated with the second predetermined thermal state reduces functionality of the portable computing device to a second reduced level relative to the first reduced level;
    means for monitoring temperature of the portable computing device by receiving temperature measurements from one or more thermal sensors;
    means for determining if the portable computing device has achieved a one of the first and second predetermined thermal states by comparing a recently received temperature measurement to a previously received temperature measurement and the respective temperature ranges associated with the first and second predetermined thermal states, wherein achieving one of the first and second predetermined thermal states is determined by recognizing that the recently received temperature measurement is indicative of a change in temperature of a predetermined magnitude relative to the previously received temperature measurement;
    means for initiating one or more first thermal mitigation techniques comprised in the respective thermal policy associated with the first predetermined thermal state in order to reduce temperature of the portable computing device as well as reduce functionality to the first reduced level, if the portable computing device has achieved the first predetermined thermal state; and
    means for initiating one or more second thermal mitigation techniques comprised in the respective thermal policy associated with the second predetermined thermal state in order to reduce temperature of the portable computing device as well as reduce functionality to the second reduced level, if the portable computing device has achieved the second predetermined thermal state.

10. The system of claim 9, wherein the one or more thermal sensors comprises at least one of an internal, on-chip thermal sensor and an external, off-chip thermal sensor.

11. The system of claim 10, further comprising means for assigning one or more thermal mitigation techniques for each thermal policy to hardware based on an association between a thermal sensor and the hardware, the thermal sensor being positioned adjacent to the hardware and on a same surface with the hardware within the portable computing device.

12. The system of claim 9, further comprising means for increasing a frequency in which temperature measurements are received when at least one of the first and second predetermined thermal states is achieved.

13. A computer program product comprising a computer usable device having a non-transitory computer readable program code embodied therein, said computer readable program code adapted to be executed to implement a method for managing thermal policies of a portable computing device comprising a chip, said method comprising:
    defining at least a first predetermined thermal state and a second predetermined thermal state, each predetermined thermal state being associated with a respective temperature range and a respective thermal policy, wherein:
        the highest temperature of a first temperature range associated with the first predetermined thermal state is equal to or less than the lowest temperature of a second temperature range associated with the second predetermined thermal state;
        a thermal policy comprises one or more thermal mitigation techniques;
        application of a thermal policy by way of one or more of its thermal mitigation techniques reduces available functionality of the portable computing device; and
        a first thermal policy associated with the first predetermined thermal state reduces functionality of the portable computing device to a first reduced level relative to an initial level and a second thermal policy associated with the second predetermined thermal state reduces functionality of the portable computing device to a second reduced level relative to the first reduced level;
    monitoring temperature of the portable computing device by receiving temperature measurements from one or more thermal sensors;
    determining if the portable computing device has achieved one of the first and second predetermined thermal states by comparing a recently received temperature measurement to a previously received temperature measurement and the respective temperature ranges associated with the first and second predetermined thermal states, wherein achieving one of the first and second predetermined thermal states is determined by recognizing that the recently received temperature measurement is indicative of a change in temperature of a predetermined magnitude relative to the previously received temperature measurement;
    if the portable computing device has achieved the first predetermined thermal state, then initiating one or more first thermal mitigation techniques comprised in the respective thermal policy associated with the first predetermined thermal state in order to reduce temperature of the portable computing device as well as reduce functionality to the first reduced level; and
    if the portable computing device has achieved the second predetermined thermal state, then initiating one or more second thermal mitigation techniques comprised in the respective thermal policy associated with the second predetermined thermal state in order to reduce temperature of the portable computing device as well as reduce functionality to the second reduced level.

14. The computer program product of claim 13, wherein the one or more thermal sensors comprises at least one of an internal, on-chip thermal sensor and an external, off-chip thermal sensor.

15. The computer program product of claim 14, wherein the program code implementing the method further comprises: assigning one or more thermal mitigation techniques for each thermal policy to hardware based on an association between a thermal sensor and the hardware, the thermal sensor being positioned adjacent to the hardware and on a same surface with the hardware within the portable computing device.

16. The computer program product of claim 13, wherein the program code implementing the method further comprises: increasing a frequency in which temperature measurements are received when at least one of the first and second predetermined thermal states is achieved.

\* \* \* \* \*